US006844377B1

(12) United States Patent  
Auweter et al.

(10) Patent No.: US 6,844,377 B1
(45) Date of Patent: Jan. 18, 2005

(54) POLYMER PARTICLES CONTAINING DYE

(75) Inventors: Helmut Auweter, Limburgerhof (DE); Heribert Bohn, Wattenheim (DE); Robert Heger, Heidelberg (DE); Ulrike Schlösser, Neustadt (DE); Karl Siemensmeyer, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/787,413

(22) PCT Filed: Sep. 29, 1999

(86) PCT No.: PCT/EP99/07229

§ 371 (c)(1),
(2), (4) Date: Mar. 22, 2001

(87) PCT Pub. No.: WO00/18846

PCT Pub. Date: Apr. 6, 2000

(30) Foreign Application Priority Data

Sep. 30, 1998 (DE) .......................... 198 45 078

(51) Int. Cl.⁷ ................................ C08K 7/16
(52) U.S. Cl. ................ 523/223; 524/560; 524/561; 524/563
(58) Field of Search .......................... 430/137; 523/335, 523/339, 200, 202

(56) References Cited

U.S. PATENT DOCUMENTS

| | | | |
|---|---|---|---|
| 3,918,688 A | * 11/1975 | Huber et al. ................... 259/4 |
| 3,936,517 A | * 2/1976 | Thomas ........................ 264/28 |
| 4,264,656 A | * 4/1981 | Reeder ..................... 427/385.5 |
| 4,665,107 A | * 5/1987 | Micale ........................ 523/105 |
| 4,692,188 A | * 9/1987 | Ober et al. .................... 106/23 |
| 4,833,060 A | * 5/1989 | Nair et al. .................. 430/137 |
| 4,965,131 A | * 10/1990 | Nair et al. .................. 428/407 |
| 5,010,150 A | * 4/1991 | Hennig et al. ................. 526/88 |
| 5,049,322 A | * 9/1991 | Devissaguet et al. ........ 264/4.1 |
| 5,270,445 A | * 12/1993 | Hou ........................... 528/502 |
| 5,290,654 A | * 3/1994 | Sacripante et al. .......... 430/137 |
| 5,304,450 A | * 4/1994 | Paine ......................... 430/137 |
| 5,679,724 A | 10/1997 | Sacripante et al. .......... 523/161 |
| 5,968,702 A | * 10/1999 | Ezenyilimba et al. ....... 430/111 |
| 6,207,338 B1 | * 3/2001 | Ezenyilimba et al. ....... 430/137 |
| 6,494,924 B1 | * 12/2002 | Auweter et al. ............... 8/456 |

FOREIGN PATENT DOCUMENTS

| | | | |
|---|---|---|---|
| DE | 197 38 145 | 3/1998 | |
| EP | 0 303 803 | 2/1989 | |
| EP | 906 931 A2 | * 4/1999 | ............. C08J/3/14 |
| JP | 61-185540 | * 8/1986 | ............. C08J/11/08 |
| JP | 6-57006 | * 3/1994 | ............. C08J/3/14 |
| WO | WO 99/51695 A1 | * 10/1999 | ........... C09D/11/00 |

* cited by examiner

Primary Examiner—David W. Wu
Assistant Examiner—Rip A. Lee
(74) Attorney, Agent, or Firm—Oblon, Spivak, McClelland, Maier & Neustadt, P.C.

(57) ABSTRACT

Dye-containing polymer particles of at least one dye in a matrix of an essentially water-insoluble polymer and having an average particle size within the range from 5 nm to 5 µm are prepared by a process which comprises precipitating the dye-containing polymer particles from a solution of the polymer and of the dye in a water-miscible organic solvent by addition of an aqueous phase thereto.

5 Claims, No Drawings

POLYMER PARTICLES CONTAINING DYE

The present invention relates to dye-containing polymer particles containing at least one dye in a matrix of an essentially water-insoluble polymer and to a process for preparing them and to their use.

Pigments and disperse dyes are the most important representatives of the group of water-insoluble dyes. It is frequently necessary, in the case of disperse dyes even essential, to apply them in colloidally disperse form. The colloidally disperse form is particularly important when the dyes are used in ink-jet printing, a widely used process, for the contactless printing of various print media, for example paper, film, photopaper and textiles. The dye-containing polymer particles must also be in the finely divided, colloidally disperse state for coloring plastics and polymeric construction materials in order that optimal color strength coupled with high lightfastness may be achieved. To obtain a colloidally disperse form, the dye crystals are generally comminuted mechanically, for example by grinding, cf. EP 716 134 A, for example. A decisive disadvantage of grinding is that metallic attritus or attritus from the grinding media ends up in the dye powder and can lead to major problems with the use of the dye powder. For example, ink-jet printing nozzles may be damaged or blocked.

Pigments and disperse dyes in colloidally disperse form have to be stabilized against recrystallization, agglomeration and flocculation. U.S. Pat. No. 5,531,816 proposes a waterborne ink-jet ink composition comprising at least one deagglomerated pigment having a particle size within the range from 5 nm to 1 $\mu$m, at least one water-insoluble organic compound and at least one amphiphilic compound. The amphiphile solubilizes the water-insoluble organic compound in the aqueous phase in the form of small droplets. The pigment is dispersed in the droplets of the water-insoluble organic compound and so maintained in the deagglomerated state.

DE 27 32 500 A describes a process for preparing water-dispersible, pulverulent disperse dyes by spray drying a solution of the dyes in formic acid, formamide, N-methylformamide, butyrolactone or ethylene glycol. The solution may further comprise dispersants, surfactants and protective colloids. The dye powder obtained consists of particles in the nanoparticle range.

Prior art dye particles all have a relatively broad particle size distribution, which is why their brilliance leaves something to be desired.

DE 198 15 129 describes precipitated, water-insoluble or sparingly water-soluble dyes in colloidally disperse form having an average particle size within the range from 5 nm to 5 $\mu$m and having a particle size distribution width of less than 50%. The dye particles are prepared by precipitating them from a solution of the dye in a water-miscible organic solvent by addition of an aqueous phase. Alternatively, the dye particles are prepared by preparing an oil-in-water emulsion from a solution of the dye in a water-immiscible organic solvent and precipitating the dye particles by stripping off the solvent.

U.S. Pat. No. 5,344,489 or U.S. Pat. Nos. 5,318,628 and U.S. Pat. No. 5,406,314 describe pigment particles which can be used in ink-jet inks or paints. They are composed of an inorganic core of, for example, silicon dioxide, surrounded by a dye layer and optionally a further layer to modify the properties. For use, these pigment particles are dispersed in a carrier comprising a thermoplastic polymer. The pigment particles are complicated to make and there is a danger that the ink-jet nozzles will become blocked with the inorganic core particles.

WO 98/10023 describes polymer dispersions wherein the polymer particles contain a dye virtually completely dissolved or dispersed in the polymer phase. To prepare the polymer dispersions, the dye is mixed into the solid polymer phase, for example by extrusion or kneading. The polymer mass obtained is then treated in an emulsifier or an extruder to convert it into a dispersion. The particles in the dispersion obtained have a size within the $\mu$m range and a broad particle size distribution. They are therefore, as disclosed in WO 98/10023, useful for the corrosion protection of metallic surfaces, but not for printing print media or textiles.

It is an object of the present invention to provide water-insoluble dyes having a small particle size and a narrow particle size distribution which are useful for printing print media and are simple to produce.

We have found that this object is achieved, surprisingly, by dye-containing polymer particles obtainable by precipitation from a solution of the dye and a water-insoluble polymer in a water-miscible organic solvent.

The present invention accordingly provides dye-containing polymer particles containing at least one dye in a matrix of an essentially water-insoluble polymer and having an average particle size within the range from 5 to 500 nm and a particle size distribution width (variance) of <40% (both measured by quasi-elastic light scattering and evaluation by the cumulant method; cf. Bruce, J. Berne and Robert Pecora, "Dynamic Light Scattering", John Wiley & Sons Inc. 1976, p. 169f.).

The dye is preferably present in the polymer in a molecularly disperse state, but it may also be present in a molecularly aggregated or microcrystalline state. The polymer matrix is preferably amorphous, but may also include crystalline or microcrystalline regions.

The average particle size is preferably within the range from 50 nm to 300 nm, especially within the range from 50 nm to 250 nm. The width of the particle size distribution is preferably <35%.

The dye used is preferably a water-insoluble or sparingly water-soluble azo, anthraquinone, quinophthalone, methine or azamethine dye or in particular a disperse dye from the following Colour Index list:

C. I. Disperse Yellow 1, 2, 3, 4, 5, 6, 7, 8, 9, 10, 11, 11:1, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 126, 149, 179, 180, 181, 182, 183, 184, 184:1, 185, 198, 200, 201, 202, 203, 204, 205, 206, 207, 208, 209, 210, 211, 212, 213, 214, 215, 216, 217, 218, 219, 220, 221, 222, 223, 224, 225, 226, 227, 228, 241.

C. I. Disperse Orange 1, 2, 3, 3:3, 4, 5, 6, 7, 8, 9, 10, 11, 12, 13, 14, 15, 16, 17, 18, 19, 20, 21, 22, 23, 24, 25, 25:1, 26, 27, 28, 29, 30, 31, 32, 33, 34, 35, 36, 37, 38, 39, 40, 41, 41:1, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 126, 127, 128, 129, 130, 131, 136, 137, 138, 139, 140, 141, 142, 143, .145, 146, 147, 148.

C. I. Disperse Red 1, 2, 3, 4, 5, 5:1, 6, 7, 8, 9, 10, 11, 12, 13, 14, 15, 16, 17, 18, 19, 20, 21, 22, 23, 24, 25, 26, 27, 28, 29, 30, 30:1, 31, 32, 33, 34, 35, 36, 38, 39, 40, 41, 43, 43:1, 46, 48, 50, 51, 52, 53, 54, 55, 55:1, 56, 58, 59, 60, 61, 63, 65, 66, 69, 70, 72, 73, 74, 75, 76, 77, 79, 80, 81, 82, 84, 85, 86, 86:1, 87, 88, 89, 90, 91, 92, 93, 94, 96, 97, 98, 100, 102, 103, 104, 105, 106, 107, 108, 109, 110, 111, 112, 113, 115, 116, 117, 118, 120, 121, 122, 123, 125, 126, 127, 128, 129, 130, 131, 132, 133, 134, 135, 136, 137, 138, 139, 140, 141, 142, 143, 144, 145, 146, 147, 148, 149, 150, 151, 151:1, 152, 153, 154, 155, 156, 157, 158, 159, 160, 161, 162, 163, 164, 165, 166, 167, 167:1, 168, 169, 170, 171, 172, 173, 174, 175, 176, 177, 178, 179, 180, 181, 182, 183, 184, 185, 186, 187, 188, 189, 190, 190:1, 191, 191:1, 192, 193, 194, 195, 205, 206, 207, 211, 223, 225, 229, 263, 273, 274, 275, 276, 277, 278, 279, 280, 281, 302:1, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 338, 339, 340, 341, 342, 343, 344, 346, 347, 348, 349, 352, 356, 359, 364, 366, 367, 369, 371.
C. I. Disperse Violet 1, 2, 3, 4, 4:1, 5, 6, 7, 8, 9, 10, 11, 12, 13, 14, 15, 16, 17, 18, 19, 20, 21, 22, 23, 24, 25, 26, 27, 28, 29, 31, 33, 34, 35, 36, 37, 38, 39, 40, 41, 42, 43, 44, 45, 46, 47, 48, 49, 50, 51, 52, 53, 54, 55, 56, 57, 58, 59, 60, 81, 86, 87, 88, 89, 91, 92, 93, 94, 95, 96, 97, 98.
C. I. Disperse Blue 1, 1:1, 2, 3, 3:1, 4, 5, 6, 7, 7:1, 8, 9, 10, 11, 12, 13, 13:1, 14, 15, 16, 17, 18, 19, 20, 21, 22, 23, 23:1, 24, 25, 26, 27, 28, 29, 30, 31, 32, 33, 34, 35, 36, 38, 39, 40, 42, 43, 44, 45, 47, 48, 49, 51, 52, 53, 54, 55, 56, 58, 60, 60:1, 61, 62, 63, 64, 64:1, 65, 66, 68, 70, 72, 73, 75, 76, 77, 79, 80, 81, 81:1, 82, 83, 84, 85, 86, 87, 88, 89, 90, 91, 92, 93, 94, 95, 96, 97, 98, 99, 100, 101, 102, 103, 104, 105, 106, 107, 108, 109, 111, 112, 113, 114, 115, 116, 117, 118, 119, 121, 122, 123, 124, 125, 126, 127, 128, 130, 131, 132, 133, 134, 136, 137, 138, 139, 140, 141, 142, 143, 144, 145, 146, 147, 148, 149, 150, 151, 152, 153, 154, 155, 156, 158, 159, 160, 161, 162, 163, 164, 165, 165:2, 166, 167, 168, 169, 170, 171, 172, 173, 174, 175, 183, 186, 195, 197, 205, 214, 281, 282, 283, 283:1, 284, 285, 286, 287, 288, 289, 290, 291, 292, 293, 294, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 349, 352, 256, 359, 366, 369, 371.
C. I. Disperse Green 1, 2, 5, 6, 9.
C. I. Disperse Brown 1, 2, 3, 4, 4:1, 5, 7, 8, 9, 10, 11, 16, 18, 19, 20, 21.
C. I. Disperse Black 1, 3, 4, 5, 6, 7, 8, 9, 10, 11, 12, 13, 14, 15, 20, 22, 24, 25, 26, 27, 28, 29, 29:1, 30, 31, 32, 33, 34, 36.
or a solvent dye from the following Colour Index list:
C. I. Solvent Yellow 2, 3, 7, 12, 13, 14, 16, 18, 19, 21, 25, 25:1, 27, 28, 29, 30, 33, 34, 36, 42, 43, 44, 47, 56, 62, 72, 73, 77, 79, 81, 82, 83, 83:1, 88, 89, 90, 93, 94, 96, 98, 104, 107, 114, 116, 117, 124, 130, 131, 133, 135, 141, 143, 145, 146, 157, 160:1, 161, 162, 163, 167, 169, 172, 174, 175, 176, 179, 180, 181, 182, 183, 184, 185, 186, 187, 189, 190, 191.
C. I. Solvent orange 1, 2, 3, 4, 5, 7, 11, 14, 20, 23, 25, 31A, 40:1, 41, 45, 54, 56, 58, 60, 62, 63, 70, 75, 77, 80, 81, 86, 99, 102, 103, 105, 106, 107, 108, 109, 110, 111, 112, 113.
C. I. Solvent Red 1, 2, 3, 4, 8, 16, 17, 18, 19, 23, 24, 25, 26, 27, 30, 33, 35, 41, 43, 45, 48, 49, 52, 68, 69, 72, 73, 83:1, 84:1, 89, 90, 90:1, 91, 92, 106, 109, 111, 118, 119, 122, 124, 125, 127, 130, 132, 135, 141, 143, 145, 146, 149, 150, 151, 155, 160, 161, 164, 164:1, 165, 166, 168, 169, 172, 175, 179, 180, 181, 182, 195, 196, 197, 198, 207, 208, 210, 212, 214, 215, 218, 222, 223, 225, 227, 229, 230, 233, 234, 235, 236, 238, 239, 240, 241, 242, 243, 244, 245, 247, 248.
C. I. Solvent Violet 2, 8, 9, 11, 13, 14, 21, 21:1, 26, 31, 36, 37, 38, 45, 46, 47, 48, 49, 50, 51, 55, 56, 57, 58, 59, 60, 61.
C. I. Solvent Blue 2, 3, 4, 5, 7, 18, 25, 26, 35, 36, 37, 38, 43, 44, 45, 48, 51, 58, 59, 59:1, 63, 64, 67, 68, 69, 70, 78, 79, 83, 94, 97, 98, 99, 100, 101, 102, 104, 105, 111, 112, 122, 124, 128, 129, 132, 136, 137, 138, 139, 143.
C. I. Solvent Green 1, 3, 4, 5, 7, 28, 29, 32, 33, 34, 35.
C. I. Solvent Brown 1, 3, 4, 5, 12, 20, 22, 28, 38, 41, 42, 43, 44, 52, 53, 59, 60, 61, 62, 63.
C. I. Solvent Black 3, 5, 5:2, 7, 13, 22, 22:1, 26, 27, 28, 29, 34, 35, 43, 45, 46, 48, 49, 50.
or one of the following disperse dyes without a Colour Index:
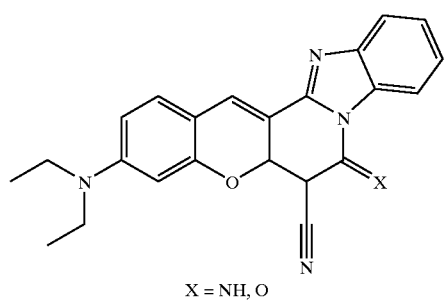
a
X = NH, O
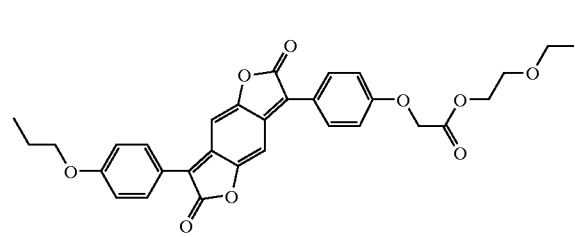
b
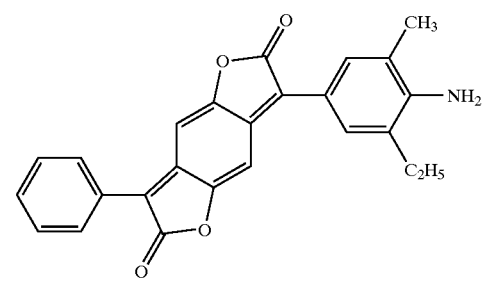
c
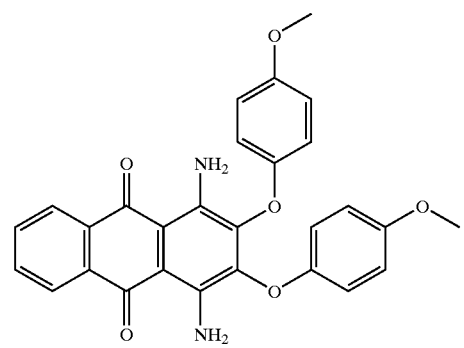
d -continued

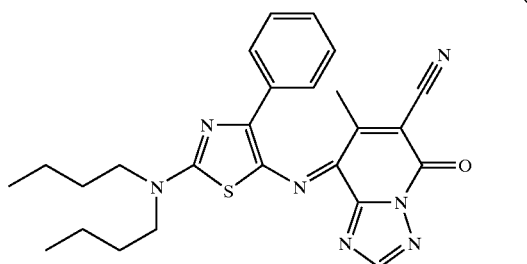

Any polymer may be used which is water-insoluble or sparingly water-soluble, but soluble in water-miscible organic solvents, so that it may be precipitated from a solution in said organic solvent together with the dye, as will be more particularly described hereinbelow. In general, the polymer used will have a water solubility of less than 5 g/l in order that the losses of polymer may be minimized and its solubility in a water-miscible organic solvent is not less than 10 g/l in order that the volumes of liquid may be minimized.

Suitable polymers include polymers obtainable by free-radical, anionic and cationic polymerization of ethylenically unsaturated groups. However, useful polymers also include addition, ring-opening and condensation polymers, such as polyesters, polyethers and polyurethanes.

Preference is given to the use of polymers obtained by free-radical polymerization which contain at least one monomer a, optionally at least one monomer b having polar groups and optionally a further monomer c, different than monomer a, as polymerized units.

The monomers a are preferably selected from
i) esters of α,β-ethylenically unsaturated $C_3$–$C_8$ monocarboxylic acids and $C_4$–$C_8$ dicarboxylic acids with $C_1$–$C_{12}$ alkanols, especially $C_1$–$C_8$ alkanols. Examples of these mono- and dicarboxylic acids are acrylic acid, methacrylic acid, crotonic acid, maleic acid, fumaric acid, itaconic acid and citraconic acid, of which acrylic acid and methacrylic acid are preferred. Examples of $C_1$–$C_{12}$ alkanols are methanol, ethanol, n-propanol, i-propanol, n-butanol, i-butanol, sec-butanol, t-butanol, 2-ethylhexanol, n-octanol and n-dodecanol. Preferred esters are methyl methacrylate, n-butyl acrylate and 2-ethylhexyl acrylate;
ii) vinyl esters of $C_1$–$C_{12}$ monocarboxylic acids, especially $C_1$–$C_8$ monocarboxylic acids. Examples of vinyl esters are vinyl acetate, vinyl propionate, vinyl butyrate, vinyl hexanoate and vinyl decanoate;
iii) aromatic vinyl compounds, such as styrene and α-methylstyrene;
iv) $C_2$–$C_6$ olefins, such as ethylene, propene, 1-butene, 2-butene and isobutene.

Monomers having polar groups are anionic monomers b1, cationic monomers b2 and nonionic monomers b3.

Anionic monomers b1 are preferably selected from
i) α,β-ethylenically unsaturated $C_3$–$C_8$ monocarboxylic acids and $C_4$–$C_8$ dicarboxylic acids and the monoesters with $C_1$–$C_{12}$ alkanols and the anhydrides thereof. Examples of these carboxylic acids are indicated above as acid components for the esters a i). Acrylic acid and methacrylic acid are preferred;
ii) aromatic vinylcarboxylic acids, such as 2-, 3- or 4-vinylbenzoic acid;
iii) monoethylenically unsaturated sulfonic and phosphonic acids, such as vinylsulfonic acid, allylsulfonic acid, vinylbenzenesulfonic acid, vinylphosphonic acid.

Particularly preferred monomers b1 are acrylic acid, methacrylic acid and vinylsulfonic acid.

The monomers b2 are ethylenically unsaturated basic nitrogen compounds. Preference is given to the esters of the above-described α,β-ethylenically unsaturated $C_3$–$C_8$ monocarboxylic acids with amino-$C_2$–$C_8$-alkanols, mono-$C_1$–$C_4$-alkylamino-$C_2$–$C_8$-alkanols or di-$C_1$–$C_4$-alkylamino-$C_2$–$C_8$-alkanols, N-vinylimidazoles and 2-, 3- or 4-vinylpyridines and the quaternary forms thereof obtained by alkylation with alkylhalides, dialkyl sulfates and alkylene oxides.

Preferred monomers b3 are N-vinyllactams, especially N-vinylpyrrolidone, esters of α,β-ethylenically unsaturated $C_3$–$C_8$ monocarboxylic acids with $C_2$–$C_8$ alkanediols and the ethoxylated or propoxylated derivatives thereof.

The monomers c are preferably selected from copolymerizable monomers c1 and crosslinking monomers c2. Useful monomers c1 are preferably amides, mono-$C_1$–$C_4$-alkylamides and di-$C_1$–$C_4$-alkylamides of the above-recited α,β-ethylenically unsaturated $C_3$–$C_8$ monocarboxylic acids, preferably acrylamide and methacrylamide, acrylonitrile, methacrylonitrile; butadiene and vinyl ethers of $C_1$–$C_8$ alkanols, especially vinyl ethyl ether.

The crosslinking monomers c2 are polyfunctional monomers having two or more nonconjugated ethylenically unsaturated bonds or, in addition to the ethylenically unsaturated bond, containing an alkoxy, hydroxyl or n-alkylol group. Examples thereof are the diesters of dihydric alcohols with the abovementioned ethylenically unsaturated monocarboxylic acids, the vinyl and allyl esters of ethylenically unsaturated carboxylic acids or aromatic divinyls, especially ethylene glycol diacrylate, 1,4-butylene glycol diacrylate, propylene glycol diacrylate, vinyl methacrylate, allyl acrylate and divinylbenzene. Examples of polyfunctional monomers c2 are the N-hydroxyalkyl- and N-alkylolamides of the mentioned ethylenically unsaturated carboxylic acids and also glycidyl acrylate and glycidyl methacrylate. The polymers thus obtained may be specifically modified with regard to their polarity by subsequent polymer-analogous reactions (hydrolysis, esterification, quaternization, sulfonation). The molecular weight of the polymers is within the range from $10^3$ to $10^7$ g/mol, preferably from $10^3$ to $10^6$ g/mol, particularly preferably from $10^3$ to $10^5$ g/mol.

Particularly preferred polymers are those which contain
- at least one ester of acrylic acid or methacrylic acid with a $C_1$–$C_4$ alkanol, especially methyl methacrylate, and optionally acrylic acid or methacrylic acid; or
- styrene and optionally acrylic acid or methacrylic acid; or
- ethylene or propylene and optionally acrylic acid or methacrylic acid;

as polymerized units.

Preferably, the polymers, in each case based on the total weight of the polymer, contain from 30 to 100% by weight, preferably from 40 to 100% by weight, of monomer a; from 0 to 60% by weight or from 0.1 to 60% by weight and preferably from 1 to 55% by weight of monomer b; and from 0 to 30% by weight or from 0.1 to 30% by weight and preferably from 1 to 20% by weight of monomer c, with the proviso that the amounts add up to 100% by weight.

The mixing ratio of dye to polymer is generally within the range from 5:1 to 1:10 parts by weight, preferably within the range from 1:2 to 1:5 parts by weight.

The present invention thus provides a process for preparing dye-containing polymer particles containing at least one dye in a matrix of an essentially water-insoluble polymer and having an average particle size within the range from 5 nm to 5 µm. The particles of the invention can be prepared by two different methods, by A) conjointly precipitating them from a solution of the dye and the polymer in a water-miscible organic solvent by addition of an aqueous phase, or B) preparing an oil-in-water emulsion from a solution of the dye and the polymer in a water-immiscible organic solvent by addition of an aqueous phase and conjointly precipitating the dye particles by stripping off the solvent.

Method A) (Water-miscible Solvent)

To produce the particles of the invention, the coarsely crystalline dye particles and the polymer are initially dissolved in a suitable water-miscible organic solvent. Which solvent is used depends on the solubility properties of the dye and the polymer. In principle, all water-miscible (which also includes those solvents which are miscible with water only to a proportion of not less than about 10% by weight) organic solvents are usable. In general, thermally stable solvents of this type are used. Suitable solvents are:

1. mono- and polyalcohols such as methanol, ethanol, n-propanol, isopropanol, glycol, glycerol, propylene glycol, polyethylene glycols, etc.;
2. ethers, such as tetrahydrofuran, dioxane, 1,2-propanediol 1-n-propyl ether, 1,2-butanediol 1-methyl ether, ethylene glycol monomethyl ether, diethylene glycol monomethyl ether, etc.;
3. esters, such as methyl acetate, ethyl acetate, butyl acetate, monoesters of ethylene glycol or propylene glycols with acetic acid, butyrolactone, etc.;
4. ketones, such as acetone or methyl ethyl ketone;
5. amides, such as formamide, dimethylformamide, dimethylacetamide, N-methylpyrrolidone and hexamethylphosphoramide;
6. sulfoxides and sulfones, such as dimethyl sulfoxide and sulfolane;
7. alkanecarboxylic acids, such as formic acid or acetic acid.

Preference is given to the solvents recited above under 1 to 6, especially methanol, ethanol, n-propanol, isopropanol, tetrahydrofuran (THF), dioxane, 1,2-butanediol 1-methyl ether, 1,2-propanediol 1-n-propyl ether, dimethylacetamide, N-methylpyrrolidone or acetone.

The amount of solvent depends on the polymer and dye to be dissolved. In general, it is desirable to keep the amount of solvent used to a minimum.

The components are generally dissolved at elevated temperature, since the solubility is too low at room temperature or below. The dissolving is preferably effected at from 50 to 300° C., especially at from 100 to 300° C. If the boiling point of the solvent is too low, the dissolving may also be effected under superatmospheric pressure, for example at a pressure of up to 50 bar.

The precipitating of the polymer-dye particles in colloidally disperse form is then effected by adding an aqueous phase (water or a mixture of water with up to 30% by weight of a water-miscible organic solvent) to the solution of the dye and of the polymer in the water-miscible organic solvent. The temperature at which the precipitating step takes place is not critical. Advantageously, water at from 0 to 50° C. is added to the hot solution.

Preferably, either the solution or the aqueous phase or both phases contain at least one protective colloid in order that the reagglomeration of the colloidally disperse particles may be prevented. Protective colloids used include the natural or synthetic polymers customarily used for this purpose. Useful natural or semisynthetic protective colloids include for example gelatin, including fish gelatin, starch or starch derivatives, such as dextrins, pectin, gum arabic, casein, caseinate, alginates, cellulose and cellulose derivatives, such as methylcellulose, carboxymethylcellulose, hydroxypropylcellulose or hydroxypropylmethylcellulose.

Useful synthetic protective colloids are water-soluble homo- or copolymers, which can be neutral polymers, cationic polymers or anionic polymers. Similarly, complexes of polycationic and polyanionic polymers and also coacervates are suitable.

The protective colloid polymers are polymerized from monomers having hydrophilic groups and optionally comonomers having hydrophobic groups, the ratio between hydrophilic and hydrophobic groups being chosen in such a way that the copolymer is water-soluble.

Suitable hydrophilic monomers include for example N-vinyllactams, such as N-vinylpyrrolidone; acrylamide or methacrylamide and their N—$C_1$–$C_4$-mono- or N,N-di-$C_1$–$C_4$-alkyl derivatives; acrylic acid or methacrylic acid; monomers having a primary, secondary or tertiary basic nitrogen atom, such as amino-$C_2$–$C_4$-alkyl acrylates and methacrylates, e.g., dimethylaminoethyl (meth)acrylate, and the $C_1$–$C_4$-alkyl-quaternized derivatives thereof; ethylenically unsaturated sulfonic acids, such as vinylsulfonic acid; acrylamido-N-propanesulfonic acid and styrenesulfonic acid; hydroxy-$C_2$–$C_4$-alkyl acrylates and methacrylates; allyl alcohol and methallyl alcohol; olefinically unsaturated compounds having epoxy groups, such as glycidyl acrylate and glycidyl methacrylate; monoesters and diesters of ethylenically unsaturated $C_4$–$C_8$-dicarboxylic acids, such as maleic acid and itaconic acid, with amino alcohols, such as dimethylaminoethanol; and amides or imides of these carboxylic acids with diamines, such as dimethylaminopropylamine.

Suitable comonomers having hydrophobic groups include for example $C_2$–$C_4$-alkyl vinyl ethers, such as ethyl vinyl ether; vinyl esters of $C_2$–$C_8$ carboxylic acids, such as vinyl acetate and vinyl propionate; $C_1$–$C_8$-alkyl acrylates and methacrylates, such as methyl, ethyl, n-butyl and 2-ethylhexyl acrylate and methacrylate; aromatic vinyl compounds such as styrene; and 1-olefins having up to 20 carbon atoms, such as ethylene, propylene or isobutylene.

Polymers useful as protective colloid are in particular polyvinylpyrrolidone, polyacrylic acid or polymethacrylic acid and copolymers thereof with a dicarboxylic anhydride of an ethylenically unsaturated $C_4$–$C_8$-carboxylic acid, such as maleic anhydride or itaconic anhydride; polyvinyl alcohol and partially hydrolyzed polyvinyl acetate; polyacrylamide and polymethacrylamide and their partially hydrolyzed derivatives; polymers of monomers having a primary, secondary or tertiary amino group and the N—$C_1$–$C_4$-mono- and N,N—$C_1$–$C_4$-dialkyl derivatives and also the $C_1$–$C_4$-alkyl-quaternized derivatives thereof; polyethylene oxides and polypropylene oxides and also block copolymers thereof; polyamino acids such as polyaspartic acid and polylysine, and also condensates of phenylsulfonic acid with urea and formaldehyde and condensates of naphthalenesulfonic acid with formaldehyde.

The amount of protective colloid in the aqueous phase is generally within the range from 1 to 50% by weight, preferably within the range from 5 to 30% by weight, based on the total weight of the aqueous phase. The weight ratio of dye and polymer to protective colloid is generally within the range from 2:1 to 1:20. The amount of aqueous phase added depends on the dye, the concentration of the dye solution and the concentration of protective colloid in the aqueous phase. In general, the dye-polymer solution and the aqueous phase are used in a weight ratio within the range from 1:2 to 1:20.

The particles may be precipitated in the presence of additives customary in such cases, for example in the presence of one of the below-mentioned surfactants.

The mixing of dye-polymer solution and aqueous phase advantageously takes place as rapidly as possible. Suitable equipment for this purpose is known to the person skilled in the art. It is possible to use, for example, Y- or T-mixers or static mixers.

The inventive process for preparing the dye particles may be operated continuously or batchwise. Before or during the further concentrating, further protective colloid may possibly be added so as to obtain even better colloidal stabilization and even better bonding of the dye in the polymer matrix.

Method B) (Water-immiscible Solvent)

To prepare the particles of the invention by method B, the coarsely crystalline dye particles and the polymer are initially dissolved in a suitable water-immiscible organic solvent. Which solvent is used depends on the solubility properties of the dye and the polymer. In principle, all water-immiscible organic solvents are usable. In general, thermally stable solvents of this type are used.

Preferred solvents are chlorinated hydrocarbons, such as chloroform, dichloroethane or methylene chloride.

The dissolving is effected as described under A).

The solvent phase is vigorously stirred into the aqueous phase with the aid of a suitable apparatus, for example an Ultra-Turrax, to prepare an emulsion, in particular an oil-in-water emulsion.

The water contains at least one emulsifier and/or at least one of the above-described protective colloids to stabilize the emulsion droplets and prevent later reagglomeration of the precipitated, colloidally disperse particles and to prevent coalescence.

The emulsifiers used include the customary emulsifiers useful for preparing emulsions. The emulsifiers may be anionic, cationic or nonionic in nature. Examples of useful emulsifiers are ethoxylated $C_8$–$C_{36}$ fatty alcohols, alkali metal and ammonium salts of $C_8$–$C_{12}$ alkyl sulfates, of $C_{12}$–$C_{18}$ alkylsulfonic acids and of alkylarylsulfonic acids ($C_9$–$C_{18}$ alkyl). Further suitable emulsifiers may be found in Houben-Weyl, Methoden der organischen Chemie, volume XIV/1, Makromolekulare Stoffe, Georg Thieme-verlag, Stuttgart, 1961, pages 192–208. Furthermore, fluorinated surfactants and silicone surfactants are particularly suited.

The amount of emulsifier and/or protective colloid in the aqueous phase is generally within the range from 1 to 50% by weight, preferably within the range from 5 to 30% by weight, based on the total weight of the aqueous phase. The weight ratio of dye and polymer to emulsifier is generally within the range from 2:1 to 1:20. The amount of aqueous phase added depends in particular on the emulsifying power of the emulsifier and on the desired emulsion droplet size. In general, the dye solution and the aqueous phase are used in a weight ratio within the range from 10 1:2 to 1:20.

The emulsifying may be carried out in the presence of additives customary in such cases, for example in the presence of one of the below-described surfactants.

As the next step of method B), the solvent is stripped out of the emulsion by reduced pressure and/or by heating the emulsion to convert the emulsion into a purely aqueous dispersion. In the process, the particles of the invention are formed by precipitation. Any additional protective colloid can be added prior to or during further concentration, in the aim of achieving even better colloidal stabilization and even better binding of the dye into the polymer matrix.

The novel process for producing the particles can be carried out continuously or batchwise.

The colloidal polymer-dye solution obtained using the process of the invention can be processed directly into the desired colorants. Alternatively, the dye solution can be concentrated by removing some of the volatiles in a conventional manner. The volatiles can also be removed completely, for example by spray drying. This provides the dyes of the invention in the form of a dry powder which can be reconverted into a colloidal solution in water.

The invention also provides a colorant comprising the dye-containing particles.

The amount of particles of the invention in the colorant is generally within the range from 0.1 to 30% by weight, preferably within the range from 1 to 15% by weight.

The as-precipitated colloidal solution of the particles can be used directly as colorant. In general, however, additive and auxiliary substances customary for the formulating of a colorant are added. Particular preference is given to processing the dyes, or colloidal dye solutions, into ink-jet ink preparations comprising particles of the invention in colloidally disperse form in an aqueous medium.

For most applications, it is necessary to add surfactants to the colorant, which are selected according to the desired field of application. The customary anionic, cationic or nonionic surfactants may be used.

Anionic surfactants include for example soaps, alkanesulfonates, olefinsulfonates, alkylarylsulfonates, alkylnaphthalenesulfonates, sulfosuccinates, alkyl sulfates and alkyl ether sulfates, alkyl methyl ester sulfonates, acylglutamates, sarcosinates and taurates. Examples are sodium lauryl sulfate, sodium lauryl ether sulfate, oleylsulfonate, nonylbenzenesulfonate, sodium dodecylbenzenesulfonate and butylnaphthalenesulfonate.

Cationic surfactants include for example alkyltrimethylammonium halides/alkyl sulfates, alkylpyridinium halides and dialkyldimethylammonium halides/alkyl sulfates.

Suitable nonionic surfactants include for example alkoxylated animal/vegetable fats and oils, e.g., maize oil ethoxylates, castor oil ethoxylates, tallow fat ethoxylates; glyceryl esters, for example glyceryl monostearate; fatty alcohol alkoxylates and oxo-alcohol alkoxylates; alkylphenol alkoxylates, for example isononylphenol ethoxylates; and sugar surfactants, for example sorbitan fatty acid esters (sorbitan monooleate, sorbitan tristearate), polyoxyethylene sorbitan fatty acid esters.

It is also possible to use zwitterionic surfactants, such as sulfobetaines, carboxybetaines, alkyldimethylamine oxides, for example tetradecyldimethylamine oxide, and polymeric surfactants, such as di-, tri- and multi-block polymers of the type (AB)x-, ABA and BAB, for example polyethylene oxide-block-polypropylene oxide, polystyrene-block-polyethylene oxide, and AB comb polymers, for example polymethacrylate-comb-polyethylene oxide.

The amount of surfactant, if present, is generally within the range from 0.5 to 25% by weight, especially within the range from 1 to 15% by weight, based on the total weight of the preparation.

In addition, the preparation may comprise further additives, such as viscosity control additives, for example water-soluble starch and cellulose derivatives as thickeners, additives for improving the drying characteristics, for example isopropanol, acetone, diethylene glycol, butyltriglycol; biocides and fungicides; sequestrants, such as ethylenediaminetetraacetic acid; and buffer solutions for pH control.

The particles and colorants of the invention are useful for printing print media, especially paper, foil, film, papers for the reproduction of digital photographic images and graphics, and also for printing textiles, especially those composed of synthetic fibers. The preferred process for printing textiles is transfer printing.

The dye-containing polymer particles of the invention have a narrow particle size distribution and so produce a cleaner color and hence better brilliance in paper and photo printing in particular. In addition, they also produce a higher color strength.

Further, the dye-containing polymer particles of the invention have advantageous viscosity characteristics and are simple to apply to the fibers.

Also, the immense range of polymers which may be used makes it possible to optimize the thermal (glass transition temperature, melting point), mechanical and optical properties (refractive index) of the particles to the particular application. In addition, the polymer particles are preparable in a simple and continuous manner.

The examples hereinbelow illustrate the invention without limiting it.

The E1/1 value is the absorbance at the absorption maximum of the dye; layer thickness 1 cm; 1% strength by weight solution of the dye in the particular solvent used for dissolving the dye and the polymer.

EXAMPLE 1

2.5 g of a blue azamethine dye and 7.5 g of PMMA (polymethyl methacrylate) are dissolved in 300 g of acetone at room temperature with stirring.

This solution is fed at a rate of 6.3 kg/h into a static mixing nozzle where it is continuously mixed with water fed at a rate of 90.8 kg/h. In the process, the polymer-dye particles are precipitated and a stable aqueous dispersion is obtained. The solvent and some of the water are stripped off to concentrate the dispersion to a dye content of 0.6%. It then has an E1/1 value of 54. The particle size is 206 nm.

EXAMPLE 2

2.5 g of a blue azamethine dye and 7.5 g of PS (polystyrene) are dissolved in 300 g of THF at room temperature with stirring.

This solution is fed at a rate of 1.89 kg/h into a static mixing nozzle where it is continuously mixed with water fed at a rate of 90.3 kg/h. In the process, the polymer-dye particles are precipitated and a stable aqueous dispersion is obtained. The solvent and some of the water are stripped off to concentrate the dispersion to a dye content of 1.04%. It then has an E1/1 value of 59. The particle size is 168 nm.

EXAMPLE 3

2.5 g of a blue azamethine dye and 7.5 g of Primacor (a 80/20 ethylene/acrylic acid copolymer) are dissolved in 300 g of THF at room temperature with stirring.

This solution is fed at a rate of 6.66 kg/h into a static mixing nozzle where it is continuously mixed with water (pH 10.4 by means of NaOH) fed at a rate of 92.6 kg/h. In the process, the polymer-dye particles are precipitated and a stable aqueous dispersion is obtained. The solvent and some of the water are stripped off to concentrate the dispersion to a dye content of 1.80%. It then has an E1/1 value of 83. The particle size is 280 nm.

EXAMPLE 4

1.0 g of a yellow azo dye and 3.0 g of Eudragit L (1/1 methyl methacrylate/acrylic acid copolymer) are dissolved in 200 g of THF at room temperature with stirring.

This solution is fed at a rate of 1.96 kg/h into a static mixing nozzle where it is continuously mixed with water fed at a rate of 90.0 kg/h. In the process, the polymer-dye particles are precipitated and a stable aqueous dispersion is obtained. The solvent and some of the water are stripped off to concentrate the dispersion to a dye content of 0.48%. It then has an E1/1 value of 65. The particle size is 241 nm.

EXAMPLE 5

1.0 g of a yellow azo dye and 1.0 g of Eudragit L and 2.0 g of Lucryl G66 (polymethyl methacrylate) are dissolved in 200 g of THF at room temperature with stirring.

This solution is fed at a rate of 1.83 kg/h into a static mixing nozzle where it is continuously mixed with water fed at a rate of 90.6 kg/h. In the process, the polymer-dye particles are precipitated and a stable aqueous dispersion is obtained. The solvent and some of the water are stripped off to concentrate the dispersion to a dye content of 0.59%. It then has an E1/1 value of 81. The particle size is 165 nm.

EXAMPLE 6

1.0 g of a magenta methine dye and 1.0 g of Eudragit L and 2.0 g of Lucryl G66 are dissolved in 200 g of THF at room temperature with stirring.

This solution is fed at a rate of 2.07 kg/h into a static mixing nozzle where it is continuously mixed with water fed at a rate of 90.7 kg/h. In the process, the polymer-dye particles are precipitated and a stable aqueous dispersion is obtained. The solvent and some of the water are stripped off to concentrate the dispersion to a dye content of 2.04%. It then has an E1/1 value of 92. The particle size is 205 nm.

EXAMPLE 7

1.0 g of a magenta methine dye and 1.0 g of Eudragit L and 2.0 g of Lucryl G66 are dissolved in 200 g of THF at room temperature with stirring.

This solution is fed at a rate of 2.06 kg/h into a static mixing nozzle where it is continuously mixed with an aqueous solution of 0.1% of a copolymer of styrene/acrylic acid/dimethyl aminoethyl methacrylate 40/20/40, fed at a rate of 89.7 kg/h. In the process, the polymer-dye particles are precipitated and a stable aqueous dispersion is obtained. The solvent and some of the water are stripped off to concentrate the dispersion to a dye content of 0.63%. It then has an E1/1 value of 84. The particle size is 267 nm.

EXAMPLE 8

2.0 g of a magenta methine dye and 2.0 g of Lucryl G66, 4.0 g of Luviskol VA 64 (60/40 vinylpyrrolidone/vinyl acetate copolymer) and 0.2 g of Leophen RA (sodium sulfosuccinate) are dissolved in 40.0 g of methylene chloride and then emulsified in an aqueous phase of 550 g of water by means of an Ultra-Turrax.

The methylene chloride is stripped off in a rotary evaporator at 60° C. and 90 mbar and the dispersion is then concentrated to a dye content of 0.36%. The particle size is 300 nm.

EXAMPLE 9

10 g of a blue azamethine dye and 30 g of Disperdur N4 (methyl methacrylate and butyl methacrylate copolymer functionalized with about 1% of primary amino functions) are dissolved in 500 g of THF at room temperature with stirring. About 30 ml of acetic acid are then added.

This solution is fed at a rate of 9.35 kg/h into a static mixing nozzle where it is continuously mixed with water fed at a rate of 90.6 kg/h. In the process, the polymer-dye particles are precipitated and a stable aqueous dispersion is obtained with a pH of 3.5. The solvent and some of the water are stripped off to concentrate the dispersion to a dye content of 5.99%. It then has an E1/1 value of 89. The particle size is 176 nm with a distribution width (variance) of 31.6%.

We claim:

1. A process for preparing dye-containing particles, comprising:
    preparing a solution of at least one dye and a water-insoluble polymer dissolved in a water-miscible organic solvent; and
    continuously comixing in a static mixing nozzle the dye/polymer solution with an aqueous phase at relative rates sufficient to precipitate dye-containing polymer particles ranging in size ranging from 5 nm to 500 nm and having a particle size distribution width of $\leq 40\%$ of the at least one dye in a polymer matrix.

2. A process as claimed in claim 1, wherein the precipitating of the polymer particles is effected in the presence of a protective colloid.

3. A process as claimed in claim 1, wherein the polymer contains, in each case based on the total weight of the polymer, from 30 to 100% by weight of at least one monomer a, from 0 to 60% by weight of at least one monomer b having polar groups and from 0 to 30% by weight of at least one further monomer c, different from monomer a, in polymerized form.

4. A process as claimed in claim 3, wherein the monomer a is selected from the group consisting of esters of $\alpha,\beta$-ethylenically unsaturated $C_3$–$C_8$ monocarboxylic acids or $C_4$–$C_8$-dicarboxylic acids with $C_1$–$C_{12}$-alkanols, vinyl esters of $C_1$–$C_{12}$ monocarboxylic acids, aromatic vinyl compounds and $C_2$–$C_6$ olefins.

5. A process as claimed in claim 3, wherein the monomer b is selected from the group consisting of $\alpha,\beta$-ethylenically unsaturated $C_3$–$C_8$-monocarboxylic acids, $\alpha,\beta$-ethylenically unsaturated $C_4$–$C_8$-dicarboxylic acids with $C_1$–$C_{12}$-alkanols and anhydrides thereof, aromatic vinylcarboxylic acids, monoethylenically unsaturated sulfonic acids and phosphonic acids, esters of $\alpha,\beta$-ethylenically unsaturated $C_3$–$C_8$-monocarboxylic acids with amino-$C_2$–$C_8$-alkanols, mono-$C_1$–$C_4$-alkylamino-$C_2$–$C_8$-alkanols or di-$C_1$–$C_4$-alkylamino-$C_2$–$C_8$-alkanols, N-vinyl lactams and esters of $\alpha,\beta$ ethylenically unsaturated $C_3$–$C_8$-monocarboxylic acids with $C_2$–$C_8$-hydroxyalcohols or the ethoxylated or propoxylated derivatives thereof.

* * * * *